United States Patent

Wong Shing

[11] Patent Number: 5,891,304
[45] Date of Patent: *Apr. 6, 1999

[54] USE OF HYDROPHILIC DISPERSION POLYMERS FOR COATED BROKE TREATMENT

[75] Inventor: Jane B. Wong Shing, Aurora, Ill.

[73] Assignee: Nalco Chemical Company, Naperville, Ill.

[*] Notice: This patent issued on a continued prosecution application filed under 37 CFR 1.53(d), and is subject to the twenty year patent term provisions of 35 U.S.C. 154(a)(2).

[21] Appl. No.: 681,029

[22] Filed: Jul. 22, 1996

[51] Int. Cl.⁶ .................................................. D21H 17/45
[52] U.S. Cl. .................................... 162/168.2; 162/168.3; 162/191
[58] Field of Search .............................. 162/168.2, 168.3, 162/191, 5

[56] References Cited

U.S. PATENT DOCUMENTS

| | | | |
|---|---|---|---|
| 4,507,422 | 3/1985 | Farrar et al. | 524/425 |
| 4,554,307 | 11/1985 | Farrar et al. | 524/425 |
| 5,131,982 | 7/1992 | St. John | 162/168.2 |
| 5,183,576 | 2/1993 | Wood et al. | 210/734 |
| 5,254,221 | 10/1993 | Lowry et al. | 162/168.2 |
| 5,466,338 | 11/1995 | Pearson | 162/168.2 |
| 5,643,460 | 7/1997 | Marble et al. | 210/705 |

*Primary Examiner*—Peter Chin
*Assistant Examiner*—Dean T. Nguyen
*Attorney, Agent, or Firm*—Margaret M. Brumm; Thomas M. Breininger

[57] ABSTRACT

A process for treating recycled coated broke which has been re-pulped to a slurry for the purpose of recycling the coated broke as cellulose fiber to the paper machine by the addition of a water-soluble polymer dispersion is claimed. The water-soluble polymer is formed by polymerizing a water-soluble mixture which comprises: (a) a cationic monomer represented by the following general formula (I):

$$\begin{array}{c} CH_2=C-R_1 \quad R_2 \\ | \quad\quad\quad | \\ O=C-A'-B'-N^+-R_4.X^- \\ | \\ R_3 \end{array} \quad (I)$$

wherein $R_1$ is H or $CH_3$; each of $R_2$ and $R_3$ is an alkyl group having 1 to 2 carbon atoms; $R_4$ is H or an alkyl group of 1 to 2 carbon atoms; A' is an oxygen atom or NH; B' is an alkylene group of 2 to 4 carbon atoms or a hydroxypropylene group; and $X^-$ is an anionic counterion; and (b) a second monomer represented by (meth)acrylamide (in an aqueous solution of a polyvalent anionic salt), wherein the polymerization is carried out in the presence of either an organic high-molecular weight multivalent cation comprising a water-soluble polymer containing at least one monomer of formula (I) and/or poly diallyl dimethyl ammonium chloride (DADMAC).

1 Claim, 2 Drawing Sheets

USE OF HYDROPHILIC DISPERSION POLYMERS FOR COATED BROKE TREATMENT

BACKGROUND OF THE INVENTION

1. Field of the Invention

The present invention relates generally to the treatment of a re-pulped coated broke slurry with a water-soluble dispersion polymer so that it can be recycled as cellulose fiber to a paper machine.

2. Description of the Prior Art

"Paper Broke" is a term used by papermakers to describe that paper which they cannot or do not sell because it does not meet minimum commercial specifications. This paper broke is a valuable source of fiber and is recycled internally at the mill although it may also be sold to other mills as a source of fiber. Unfortunately, paper broke frequently contains coatings that are applied to the base sheet of paper as it is being manufactured. When the paper broke contains these coatings it is referred to as a "Coated Broke". Coated broke presents special problems in the recovery of fiber values because the coatings introduce materials which would not normally be present in the original stock of fiber used to manufacture the base paper sheet.

The coating materials contained on coated broke may account for from about ten (10) to about forty (40) weight percent of the total solids in the paper finish. The major components of the coatings are pigments which normally constitute from about 80 to 95% of the coating mass, and the binders are contained on the coating from about 5 to about 20 weight percent of the coating mass.

The pigments normally are composed of typical pigments and fillers used in manufacture of paper, which pigments and fillers can include clays of various types, calcium carbonate, titanium dioxide, and other similar or specialty pigments and fillers.

The binders used are frequently those binders obtained from normal latex polymers such as those derived from styrene-butadiene resins, polyvinyl acetate resins, polyvinyl alcohol resins, and polyacrylic or polyacrylate resins. Certain binders can be customized depending upon the end result desired by the papermaker.

The combination of these binder materials, which can also include certain natural products such as starches and dextrans, with the pigments and fillers earlier mentioned, all of which are contained as part of the coating in a coated broke presents certain problems when the coated broke is recycled to recover fiber values.

The most difficult problem involved with recycling of coated brokes is derived from the binder materials, sometimes in combination with pigments or fillers, since these polymers and the materials to which they have been attached, are the origin of sticky deposits. These sticky deposits, referred to as "white pitch" cause difficulties when recycled back to the paper machine operation. In addition to these white pitch sticky deposits, problems that are caused can include, but are not necessarily limited to, those problems associated often with the standard pitch derived from, natural wood fibers. The problems caused by inclusion of this white pitch in the papermaking process using recycled coated brokes can include off specification paper caused by holes and/or deposits of the white pitch, machine down time resulting from sheet breaks or more frequent machine cleanup, clogging of the felts used in the manufacture of the base sheet, and the like.

In the past, polymers derived from crosslinked or linear epichlorohydrin/dimethylamine (EPI-DMA) reactants have been used to treat coated broke. These materials, though effective in certain coated broke applications, have difficulties of their own primarily derived from the fact that the materials may be crosslinked and can form gel particles which provide their own difficulties in further processing of the paper sheet. In addition, although this EPI-DMA material is highly cationically charged, as originally considered necessary for this type of application, it has been found that this very high cationic charge density is not necessary for effective treatment of coated broke and the white pitch derived therefrom.

Recently, copolymers containing the monomer diallyl dimethyl ammonium chloride (DADMAC) and acrylamide have been added to re-pulped coated broke slurries for the purpose of coagulating white pitch. Such a method is disclosed in U.S. Pat. No. 5,131,982, issued to St. John, the disclosure of which is herein incorporated by reference. Homopolymers of DADMAC have also been suggested for use in the St. John patent.

These coagulants come as either solution polymers or as water-in-oil emulsion polymers. Solution polymers are limited to lower molecular weight polymers at relatively low concentrations. It is known that higher molecular weight polymers can provide improved treatment of coated broke. One way of obtaining higher molecular weight polymers in a liquid form is to package the polymer in a water-in-oil emulsion. This type of polymer, though, typically requires more elaborate feeding equipment than that required for the solution polymers, and this has caused a great reluctance amongst papermakers to using this type of polymer.

Certain hydrophobic dispersion polymers have been suggested as a means of overcoming the above problems. U.S. Pat. No. 5,466,338, issued to Pearson, the disclosure of which is incorporated herein by reference, discloses a method of treating coated broke by utilizing copolymers and terpolymers of benzyl chloride quaternaries. In these polymers the hydrophobic moiety prevents the polymer from fully solubilizing and reaching full activity.

SUMMARY OF THE INVENTION

A process for treating recycled coated broke which has been re-pulped to a slurry for the purpose of recycling the coated broke as cellulose fiber to the paper machine by the addition of a water-soluble polymer dispersion is claimed. The water-soluble polymer is formed by polymerizing a water-soluble mixture which comprises: (a) a cationic monomer represented by the following general formula (I):

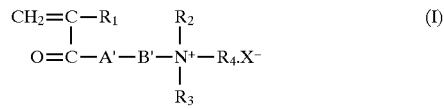

wherein $R_1$ is H or $CH_3$; each of $R_2$ and $R_3$ is an alkyl group having 1 to 2 carbon atoms; $R_4$ is H or an alkyl group of 1 to 2 carbon atoms; A' is an oxygen atom or NH; B' is an alkylene group of 2 to 4 carbon atoms or a hydroxypropylene group; and $X^-$ is an anionic counterion; and (b) a second monomer represented by (meth)acrylamide (in an aqueous solution of a polyvalent anionic salt), wherein the polymerization is carried out in the presence of either an organic high-molecular weight multivalent cation comprising a water-soluble polymer containing at least one monomer of formula (I) and/or poly diallyl dimethyl ammonium chloride (DADMAC).

The dispersion polymer is added to the coated broke slurry in an amount between about 0.2 pounds active polymer per ton of total broke solids to about 10 pounds active polymer per ton of total broke solids, more preferably between about 0.5 pounds polymer per ton total broke solids to about 5 pounds per ton.

The preferred dispersion polymers comprise about 70–99 mole % acrylamide and about 1–30 mole % dimethylaminoethyl acrylate methyl chloride quaternary (DMAEA.MCQ).

The present invention describes the use of high molecular weight hydrophilic dispersion polymers to treat coated broke by coagulating white pitch. Dispersion polymers have an added advantage in that they only require feed equipment similar to that used for a solution polymer. Dispersion polymers are also substantially more effective than equivalent dosage of solution polymer due to their high molecular weights. Moreover, dispersion polymers are as effective as emulsion polymers, but do not require the elaborate feeding equipment utilized by emulsion polymers. Further, dispersion polymers contain no oil or surfactants and are therefore more environmentally friendly than emulsion polymers.

DESCRIPTION OF THE PREFERRED EMBODIMENTS

Figure 1:
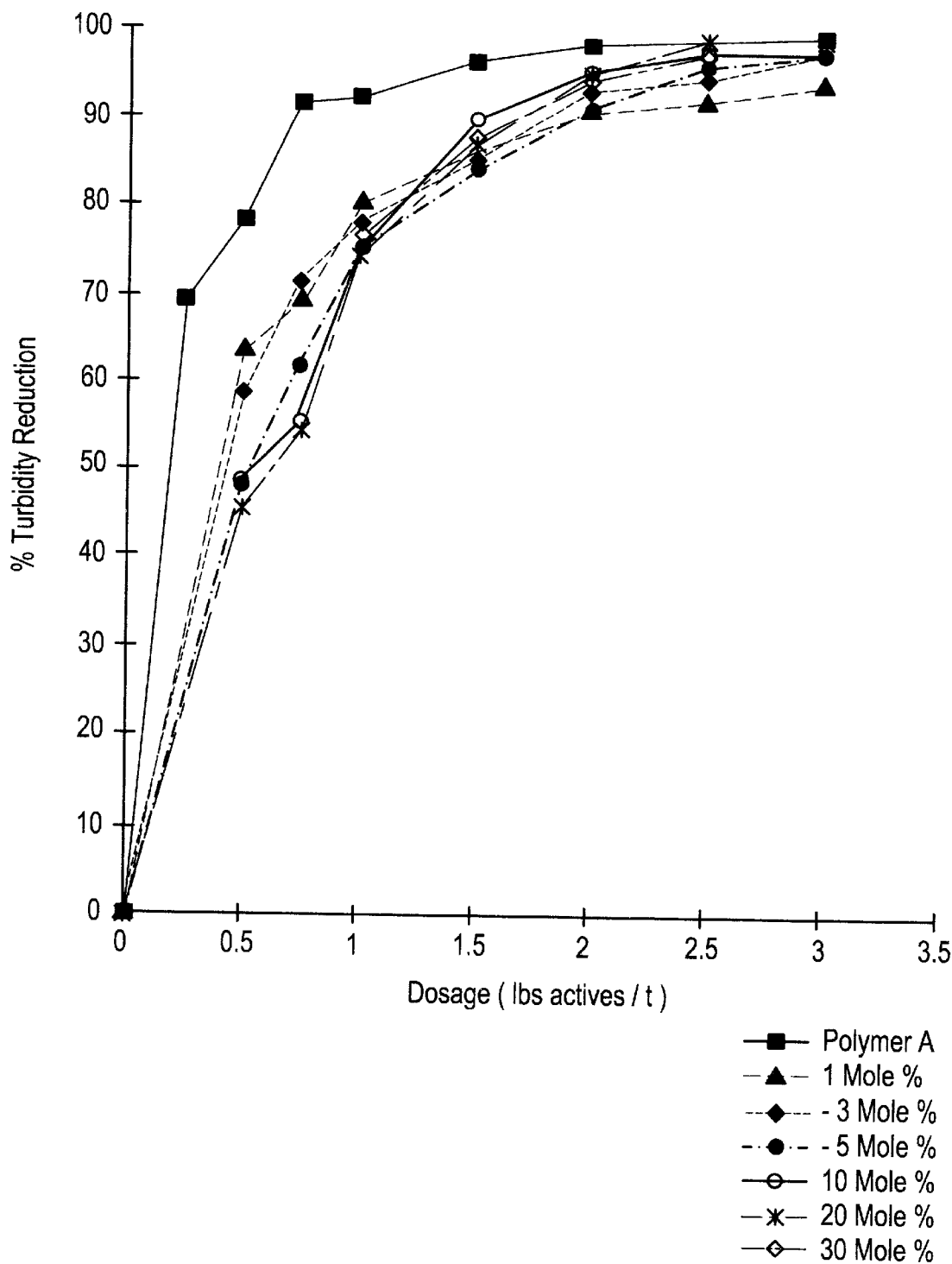
FIG. 1 is a graph comparing turbidity reduction of DMAEA.MCQ/AcAm copolymers with turbidity reduction of Polymer A in coated broke at varying levels of polymer dosage.
Figure 2:
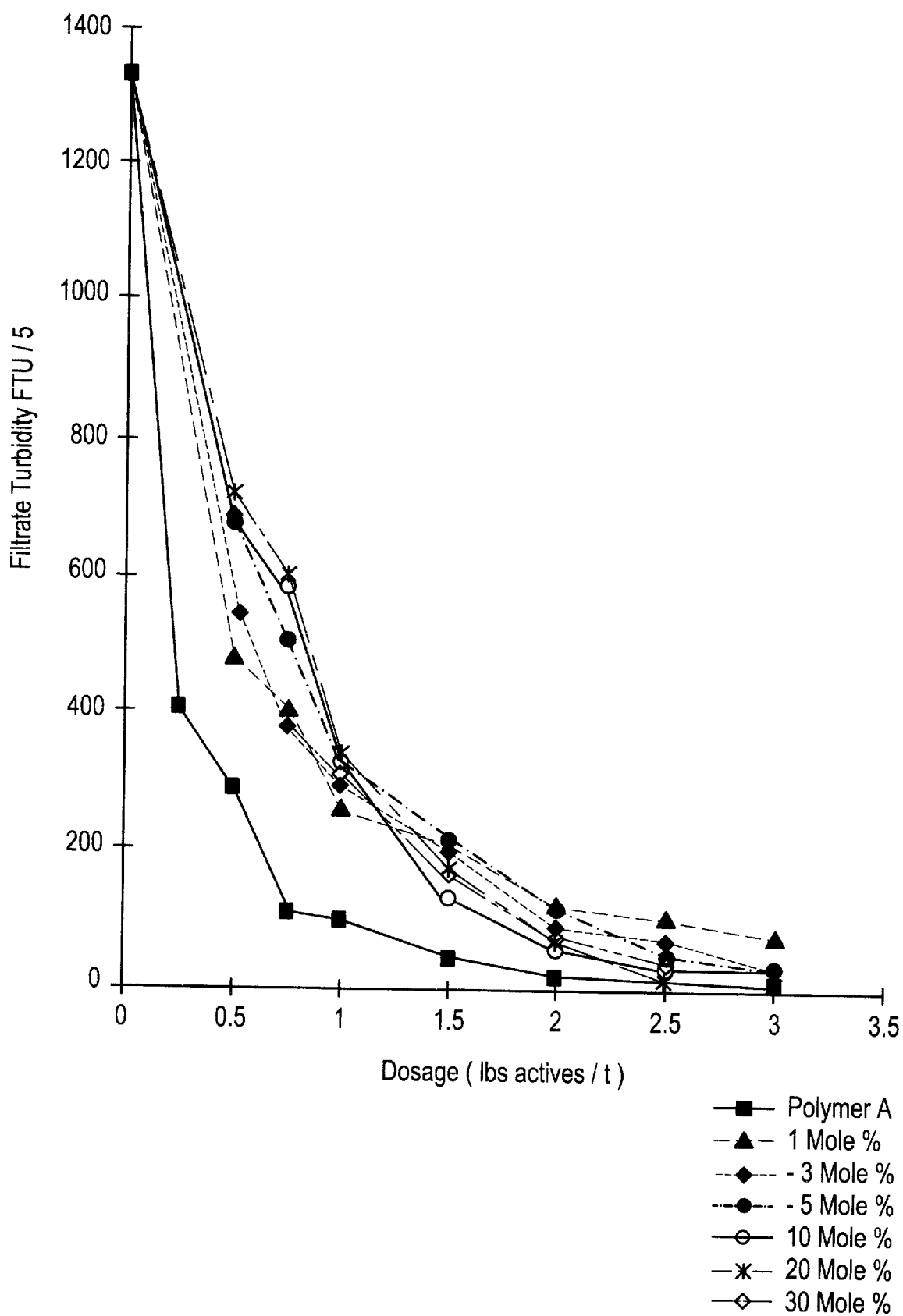
FIG. 2 is a graph comparing filtrate turbidity of DMAEA.MCQ/AcAm copolymers with filtrate turbidity of Polymer A in coated broke at varying levels of polymer dosage.

The invention provides a method for treating recycled coated broke which has been re-pulped to a slurry for the purpose of recycling the coated broke as cellulose fiber to the paper machine. The improvement comprises adding to the coated broke slurry an effective amount of a dispersion polymer which can be more easily applied than an emulsion polymer, and is more effective than solution polymers typically used for this application.

The cationic monomer is present in an amount between about 1 to about 30 mole %, the (meth)acrylamide is present in an amount between about 70 to about 99 mole %, and the organic high-molecular weight multivalent cation is present in an amount between about 1 to about 10 percent by weight.

Examples of the monomer represented by Formula (I) above include salts such as dimethylaminoethyl (meth)acrylate, diethylaminoethyl (meth)acrylate, dimethylaminopropyl (meth)acrylamide, diethylaminopropyl (meth)acrylamide and dimethylhydroxypropyl (meth)acrylate, and methylated and ethylated quaternary salts. The concentration of the above monomers in the polymerization reaction mixture is suitably in the range of 5 to 30% by weight.

The multivalent anionic salt used to disperse the polymer in the present invention is a sulfate or a phosphate, and typical examples of these salts include ammonium sulfate, sodium sulfate, magnesium sulfate, aluminum sulfate, ammonium hydrogenphosphate, sodium hydrogenphosphate and potassium hydrogenphosphate. The salt is used in the form of a salt aqueous solution at a concentration of 15% or more, preferably 20% by weight or more.

The dispersant used in this invention comprises one or more organic high-molecular weight multivalent cation(s) which are soluble in the above-mentioned salt aqueous solution, and they are used in an amount of 1 to 10% by weight based on the total weight of the monomers. These dispersants have no effect on depositing the polymer.

A water-soluble radical-forming agent can be employed to aid in the polymerization of the monomers, e.g., water-soluble azo compounds such as 2,2'-azo bis (2-amidinopropane) hydrochloride and 2,2'-azobis(N,N'-dimethyleneisobutylamine) hydrochloride.

The amount of dispersion polymer which has been found effective for treating white pitch and its components, the pigments and binders described above, ranges from a concentration of approximately 0.2 pounds active polymer per ton of total broke solids to about 10 pounds active polymer per ton of total broke solids.

Preferably, treatment levels range from between about 0.5 pounds polymer per ton total broke solids to about 5 pounds per ton. Most preferably, the effective treatment ranges are between about 0.75 pounds per ton to about 3.5 pounds per ton, although each source of coated broke can and does have its own character and the treatment level demand for our polymers to treat white pitch does vary with the source of coated broke fibers.

The following example is presented to describe preferred embodiments and utilities of the invention and is not meant to limit the invention unless otherwise stated in the claims appended hereto.

EXAMPLE 1

A series of DMAEA-MCQ/AcAm dispersion polymers was evaluated in coated broke obtained from a Michigan paper mill. The cationic dispersion polymers performed as well as the reference polymer, Polymer A (AcAm/DADMAC:70/30) for the dosage range 1.5 to 3.0 lbs/ton.

The test procedure used to evaluate polymer activity for the treatment of coated broke is a vacuum filtration test. The vacuum filtration test measures the ability of the hydrophilic dispersion polymers to retain coated broke materials during vacuum filtration through a coarse filter paper. The test conditions used for the polymer evaluation are given in Table I below. The polymer performance is determined by measuring the filtrate turbidity. The filtrate turbidity was measured at 450 nm using a Hach model DR2000 spectrophotometer. The filtrate turbidity is taken as being proportional to the concentration of suspended solids.

TABLE I

| Filter Turbidity Test Conditions | |
|---|---|
| Sample Size | 200 ml coated broke |
| Mixing Speed | 500 rpms with Britt jar propeller in 400 ml beaker |
| Mixing Sequence | t = 0   start mixer |
| | t = 10 seconds   add polymer |
| | t = 30 seconds   stop mixing |
| Polymer Concentration | Dosed as 0.13 to 0.5 weight percent as polymer |
| Filtration | 9 cm Buchner funnel and 500 ml filter flask with coarse Filpaco filter paper; sample filtered to completion |
| Test | Phototester Turbidity of 10 to 20 mls filtrate diluted to 50 ml with DI water determined |

A series of DMAEA-MCQ dispersion polymers was evaluated. The consistency of the coated broke was 3.76%. The dispersion polymers contained from 1 mole percent to 30 mole percent cationic charge. Polymer A which is a typical polymer for coated broke treatment, was used as a reference. The results are summarized in Table II. The cationic dispersion polymers performed as well as Polymer A for the dosage range 1.5 to 3.0 lbs/ton.

TABLE II

Screening of DMAEA.MCQ/AcAm Dispersion Polymers for Coated Broke Treatment

| Exp. No. | Mole % DMAEA.MCQ | Mole (ml) | Dose (#/t) | Turbidity (FTU) | Turbidity Reduction |
|---|---|---|---|---|---|
| Average Blank | | 0 | 0.00 | 1328 | |
| 1 | | 0.5 | 0.25 | 403 | 69.7 |
| 2 | | 1 | 0.50 | 286 | 78.5 |
| 3 | | 1.5 | 0.75 | 111 | 91.6 |
| 4 | | 2 | 1.00 | 100 | 92.5 |
| 5 | | 3 | 1.50 | 47 | 96.5 |
| 6 | | 4 | 2.00 | 22 | 98.3 |
| 7 | | 5 | 2.50 | 19 | 98.6 |
| 8 | | 6 | 3.00 | 10 | 99.2 |
| 9 | 1 | 1 | 0.50 | 478 | 64.0 |
| 10 | 1 | 1.5 | 0.75 | 402 | 69.7 |
| 11 | 1 | 2 | 1.00 | 258 | 80.6 |
| 12 | 1 | 3 | 1.50 | 201 | 84.9 |
| 13 | 1 | 4 | 2.00 | 120 | 91.0 |
| 14 | 1 | 5 | 2.50 | 105 | 92.1 |
| 15 | 1 | 6 | 3.00 | 79 | 94.1 |
| 16 | 3 | 1 | 0.50 | 542 | 59.2 |
| 17 | 3 | 1.5 | 0.75 | 376 | 71.7 |
| 18 | 3 | 2 | 1.00 | 289 | 78.2 |
| 19 | 3 | 3 | 1.50 | 165 | 87.6 |
| 20 | 3 | 4 | 2.00 | 91 | 93.1 |
| 21 | 3 | 5 | 2.50 | 72 | 94.6 |
| 22 | 3 | 6 | 3.00 | 34 | 97.4 |
| 23 | 5 | 1 | 0.50 | 678 | 48.9 |
| 24 | 5 | 1.5 | 0.75 | 504 | 62.0 |
| 25 | 5 | 2 | 1.00 | 330 | 75.2 |
| 26 | 5 | 3 | 1.50 | 210 | 84.2 |
| 27 | 5 | 4 | 2.00 | 117 | 91.2 |
| 28 | 5 | 5 | 2.50 | 52 | 96.1 |
| 29 | 5 | 6 | 3.00 | 34 | 97.4 |
| 30 | 10 | 1 | 0.50 | 684 | 48.5 |
| 31 | 10 | 1.5 | 0.75 | 584 | 56.0 |
| 32 | 10 | 2 | 1.00 | 321 | 75.8 |
| 33 | 10 | 3 | 1.50 | 133 | 90.0 |
| 34 | 10 | 4 | 2.00 | 63 | 95.3 |
| 35 | 10 | 5 | 2.50 | 45 | 96.6 |
| 36 | 10 | 6 | 3.00 | 12 | 99.1 |
| 37 | 20 | 1 | 0.50 | 724 | 45.5 |
| 38 | 20 | 1.5 | 0.75 | 602 | 54.7 |
| 39 | 20 | 2 | 1.00 | 337 | 74.6 |
| 40 | 20 | 3 | 1.50 | 173 | 87.0 |
| 41 | 20 | 4 | 2.00 | 68 | 94.9 |
| 42 | 20 | 5 | 2.50 | 14 | 98.9 |
| 43 | 20 | 6 | 3.00 | 14 | 98.9 |
| 44 | 30 | 1 | 0.50 | 690 | 48.0 |
| 45 | 30 | 1.5 | 0.75 | 504 | 62.0 |
| 46 | 30 | 2 | 1.00 | 306 | 77.0 |
| 47 | 30 | 3 | 1.50 | 195 | 85.3 |
| 48 | 30 | 4 | 2.00 | 80 | 94.0 |
| 49 | 30 | 5 | 2.50 | 35 | 97.4 |
| 50 | 30 | 6 | 3.00 | 13 | 99.0 |

TABLE III

Treatment of Coated Broke with DMAEA.MCQ/AcAm Dispersion Polymers Consistency 3.76%

| Type | Cationic Mole % | DMAEA.MCQ Mole % | RSV .125N NO3 |
|---|---|---|---|
| Latex Polymer A | 30 | DADMAC | N/A |
| Dispersion | 1 | 1 | 11.9 |
| Dispersion | 3 | 3 | 15.7 |
| Dispersion | 5 | 5 | 14.1 |
| Dispersion | 10 | 10 | 17.0 |
| Dispersion | 20 | 20 | 21.2 |
| Dispersion | 30 | 30 | 17.0 |

Changes can be made in the composition, operation and arrangement of the method of the present invention described herein without departing from the concept and scope of the invention as defined in the following claims:

I claim:

1. A process for treating recycled coated broke which has been re-pulped to a slurry for the purpose of recycling the coated broke as cellulose fiber to the paper machine, which comprises:

adding to such slurry a water soluble hydrophilic dispersion polymer at a level of from about 0.2 pounds to 10 pounds polymer contained in the dispersion per ton of total broke solids;

wherein said water soluble hydrophilic dispersion polymer is a copolymer of acrylamide and dimethylaminoethylacrylate methylchloride quaternary (DMAEA.MCQ), wherein the mole percentages of acrylamide and dimethylaminoethylacrylate methylchloride quaternary (DMAEA.MCQ) in said copolymer are about 70–99 mole % and 1–30 mole %, respectively;

wherein the polymerization to make said copolymer is carried out in the presence of a compound selected from the group consisting of:

A) an organic high-molecular weight multivalent cation comprising a water-soluble polymer containing at least one monomer of formula (I),

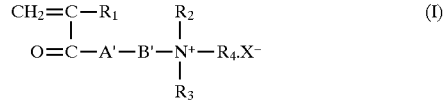

wherein $R_1$ is H or $CH_3$; each of $R_2$; and $R_3$ is an alkyl group having from 1 to 2 carbon atoms; $R_4$ is H or an alkyl group having from 1 to 2 carbon atoms; A' is an oxygen atom or NH; B' is an alkylene group of 2 to 4 carbon atoms or a hydroxypropylene group; and $X^-$ is an anionic counterion;

B) poly diallyl dimethyl ammonium chloride; and

C) mixtures thereof.

* * * * *